(12) United States Patent  
Carlsen et al.

(10) Patent No.: US 10,012,211 B2  
(45) Date of Patent: Jul. 3, 2018

(54) ABSORBER FOR A WIND TURBINE

(71) Applicant: SIEMENS AKTIENGESELLSCHAFT, München (DE)

(72) Inventors: Peter Kaufmann Carlsen, Billund (DK); Henning Ebbesen, Skjern (DK); Torben Lauritsen, Holstebro (DK)

(73) Assignee: SIEMENS AKTIENGESELLSCHAFT (DE)

( * ) Notice: Subject to any disclaimer, the term of this patent is extended or adjusted under 35 U.S.C. 154(b) by 308 days.

(21) Appl. No.: 14/708,319

(22) Filed: May 11, 2015

(65) Prior Publication Data

US 2015/0345475 A1    Dec. 3, 2015

(30) Foreign Application Priority Data

May 28, 2014  (EP) .................................... 14170346

(51) Int. Cl.

| | |
|---|---|
| *F03D 11/00* | (2006.01) |
| *F03D 1/06* | (2006.01) |
| *F03D 7/02* | (2006.01) |
| *B08B 1/00* | (2006.01) |
| *F03D 80/70* | (2016.01) |
| *F03D 9/25* | (2016.01) |

(52) U.S. Cl.  
CPC ............ *F03D 7/0224* (2013.01); *B08B 1/001* (2013.01); *F03D 1/06* (2013.01); *F03D 1/0691* (2013.01); *F03D 9/25* (2016.05); *F03D 80/70* (2016.05); *F05B 2260/406* (2013.01); *F05B 2260/98* (2013.01); *Y02E 10/721* (2013.01); *Y02E 10/723* (2013.01)

(58) Field of Classification Search  
CPC . F03D 80/70; F03D 1/06; F03D 1/065; F03D 1/0691; F03D 7/0224; F03D 9/25; F05B 2260/98; F05B 2260/406; F05D 80/88  
See application file for complete search history.

(56) References Cited

U.S. PATENT DOCUMENTS

| | | | |
|---|---|---|---|
| 2006/0204360 A1* | 9/2006 | Hinz ..................... | F03D 7/0224 415/175 |
| 2010/0124507 A1* | 5/2010 | Wallace ................ | F16N 31/004 416/248 |
| 2011/0062720 A1* | 3/2011 | Reinhard ............... | F03D 80/82 290/55 |

FOREIGN PATENT DOCUMENTS

| | | |
|---|---|---|
| DE | 102011052506 A1 | 2/2013 |
| JP | 2000005597 A | 1/2000 |

(Continued)

OTHER PUBLICATIONS

Extended European search report; Application No. 14170346.2-1607; Siemens Aktiengesellschaft; 6 pgs.

*Primary Examiner* — Jason Shanske  
*Assistant Examiner* — Jesse Prager  
(74) *Attorney, Agent, or Firm* — Schmeiser Olsen & Watts LLP

(57) ABSTRACT

A wind turbine including a rotatable part, at least one absorber element secured to the rotatable part within an interior of the wind turbine, the at least one absorber element at least partly comprising lubricant absorbing material, wherein the absorber element is configured to absorb emerging lubricant inside the wind turbine is provided. Further, a rotor hub for a wind turbine, an absorber element for a wind turbine and a method for maintaining a clean environment in a wind turbine is also provided.

8 Claims, 4 Drawing Sheets

(56) References Cited

FOREIGN PATENT DOCUMENTS

WO     WO2012/113402 A1    8/2012
WO     WO 2013037086 A1    3/2013

\* cited by examiner

ABSORBER FOR A WIND TURBINE

CROSS-REFERENCE TO RELATED APPLICATIONS

This application claims priority to EP Application No. 14170346.2, having a filing date of May 28, 2014, the entire contents of which are hereby incorporated by reference.

FIELD OF TECHNOLOGY

The following relates to a wind turbine, a rotor hub for a wind turbine, an absorber element for a wind turbine and a method for maintaining a clean environment in a wind turbine.

BACKGROUND

Alternative energy sources have become much more necessary as fossil fuels are depleted and pollute the environment. Wind energy is one of the most cost effective of all types of renewable energy. However, to make wind a viable source of energy or electricity in particular careful design of wind-capturing machines is necessary. A variety of principles of physics are used to create wind turbines that can efficiently capture energy from the wind. Wind turbines can be onshore or offshore.

A wind turbine typically includes a tower, a nacelle supported by the tower and a rotor mounted to the nacelle. The rotor is coupled via a drive train to a generator housed inside the nacelle. The rotor includes a central rotor hub and a plurality of blades mounted to and extending radially from the rotor hub.

A wind turbine typically includes many bearings that provide relative movement between adjacent parts in a relatively efficient, low-friction manner. Bearings typically require lubrication like, e.g., oil or grease to operate in with low friction and prolong their lifetime.

In an exemplary situation of an oil spillage caused by, e.g., leaking blade bearings of a hydraulic blade pitch system, there is a need for absorbing hydraulic oil wasted inside the rotor hub. Thereby, it is a general intention to collect and/or absorb the oil before escaping the rotor hub and before causing environmental damage to the nearest surrounding of the wind turbine.

WO2012/113402 A1 relates to a sealing system for a wind turbine comprising a first component and a second component positioned proximate the first component and movable relative thereto. An absorbent element is secured to the first component and comprises an oil-absorbent material.

An alternative exemplary embodiment of oil absorbing would be the utilization of watercut oil absorbing plates, directly mounted at reinforcement plates of the blade bearings. However, the installation of such kind of absorbing plates is expensive and not satisfying with regard to service and maintenance activities. As a further disadvantage, such absorbing plates cannot be secured or mounted during initial installation or production of a wind turbine as they are hindering the installation of rotor blades during, e.g., erection of the wind turbine.

SUMMARY

An aspect relates to an improved approach for a wind turbine to ensure effective absorbing of oil or grease.

In order to overcome this problem, a wind turbine is provided, comprising
  a rotatable part;
  at least one absorber element secured to the rotatable part within an interior of the wind turbine;
  the at least one absorber element at least partly comprising lubricant absorbing material, wherein the absorber element is configured to absorb emerging lubricant inside the wind turbine.

The absorber element according to the proposed solution has a low complexity and a simple design. The proposed absorber element can be secured/mounted during production of the wind turbine without hindering, e.g., the installation of rotor blades.

Thus, securing one or a number of absorber elements to a rotatable part within the interior of the wind turbine is a simple and cheap solution for absorbing any lubricant wasted inside the wind turbine. The rotatable part may be able to rotate about the same or approximately about the same rotation axis as a rotor hub or a generator of the wind turbine.

Due to the ongoing rotation of the rotating part of the wind turbine the lubricant like, e.g., oil spillage will run past the absorber element continuously where it will be collected and absorbed.

In an embodiment, the lubricant absorbing material comprises oil-absorbent and/or grease-absorbent material.

In another embodiment, the lubricant absorbing material comprises polypropylene.

In a further embodiment, the at least one absorber element comprises a container with the lubricant absorbing material located inside the container.

The at least one absorber element may be also a box or any other element with a shape adjusted to the respective characteristics of the interior within the wind turbine.

In a next embodiment, the container comprises at least one hole and/or at least one opening.

Wasted lubricant running past the container will pass through the at least one hole and/or the at least one opening and will be collected and absorbed by the lubricant absorbing material housed by the container.

It is also an embodiment that the at least one absorber element is secured to the rotatable part of a rotor hub of the wind turbine.

Pursuant to another embodiment, the at least one absorber element is secured
  to at least one reinforcement plate located within an interior of the rotor hub, or
  to an inner surface of the rotor hub.

According to an embodiment, at least a part of the at least one hole and/or the at least one opening of the container is located at a side of the container closest to the at least one reinforcement plate or to the inner surface of the rotor hub. This allows easy access of wasted lubricant running past the container to the absorbing material located inside the container.

According to another embodiment, the absorber element comprises at least one guiding means for guiding the lubricant to the absorber element.

One embodiment of the at least one guiding means may be, e.g., oil guides in form of plates or shovels, guiding or shoveling the lubricant to the absorber element.

The problem stated above is also solved by a rotor hub for a wind turbine, comprising
- a rotatable part;
- at least one absorber element secured to the rotatable part within an interior of the rotor hub;
- the at least one absorber element at least partly comprising lubricant absorbing material, wherein the absorber element is configured to absorb emerging lubricant inside the rotor hub.

The problem stated above is also solved by an absorber element for a wind turbine, comprising
- at least one securing element for securing the absorber element to a rotatable part within an interior of the wind turbine;
- lubricant absorbing material, wherein the absorber element is configured to absorb emerging lubricant inside the wind turbine.

In an embodiment, the absorber element comprises a container with the lubricant absorbing material located inside the container.

In yet another embodiment, the container comprises at least one hole and/or at least one opening.

The problem stated above is also solved by a method for maintaining a clean environment in a wind turbine, comprising the following steps:
- securing at least one a absorber element to a rotatable part of the wind turbine, the at least one absorber element comprising lubricant absorbing material;
- operating the wind turbine, so that the rotatable part of the wind turbine rotates relative to a static part of the wind turbine; and
- absorbing emerging lubricant inside the wind turbine with the at least one absorber element.

BRIEF DESCRIPTION

Some of the embodiments will be described in detail, with reference to the following figures, wherein like designations denote like members, wherein.

DETAILED DESCRIPTION

Figure 1:
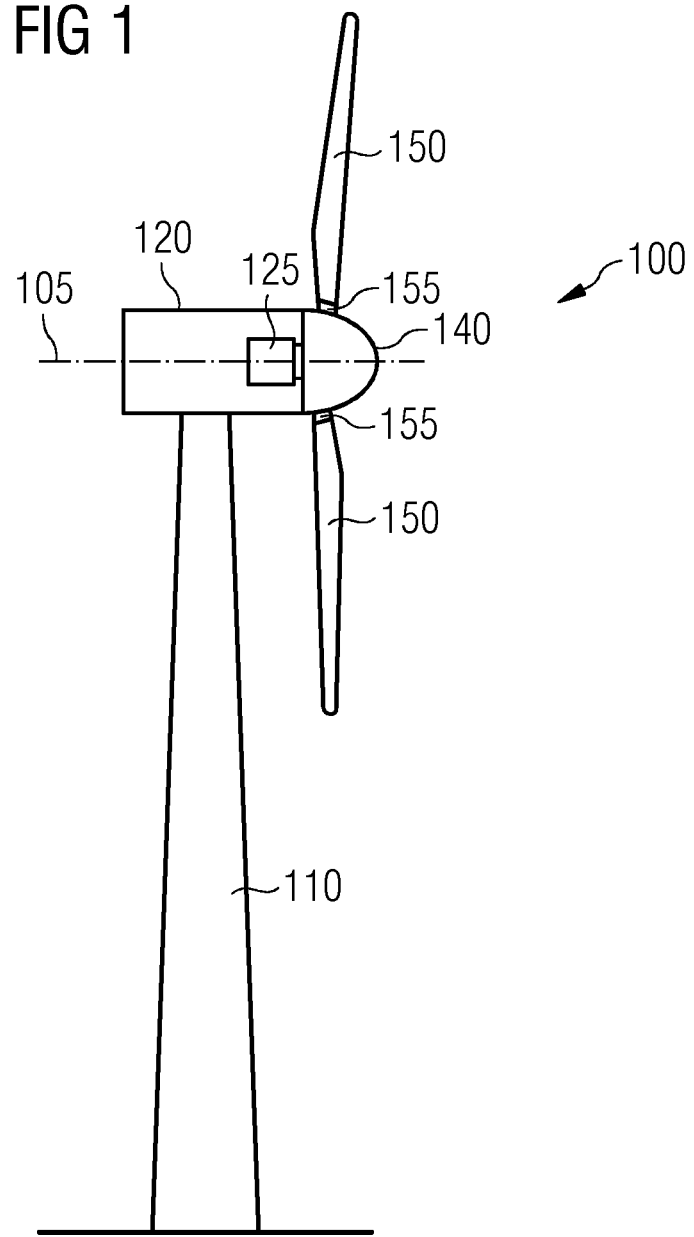
FIG. 1 shows an exemplary schematic overview of a wind turbine.

With reference to FIG. 1 an exemplary schematic overview of a wind turbine 100 is shown. The wind turbine 100 comprises a tower 110, a nacelle 120 and a rotor hub 140. The nacelle 120 is located on top of the tower 110. The rotor hub 140 comprises a number of wind turbine blades 150. The blades 150 may be rotatable mounted to the rotor hub 140 by respective blade bearings 155 allowing the blades 150 to be pitched into or out of the wind.

The rotor hub 140 is mounted to the nacelle 120 such, that it is able to rotate about a rotation axis 105. A generator 125 is located inside the nacelle 120. The wind turbine 100 can be, e.g., a direct drive wind turbine.

Figure 2:
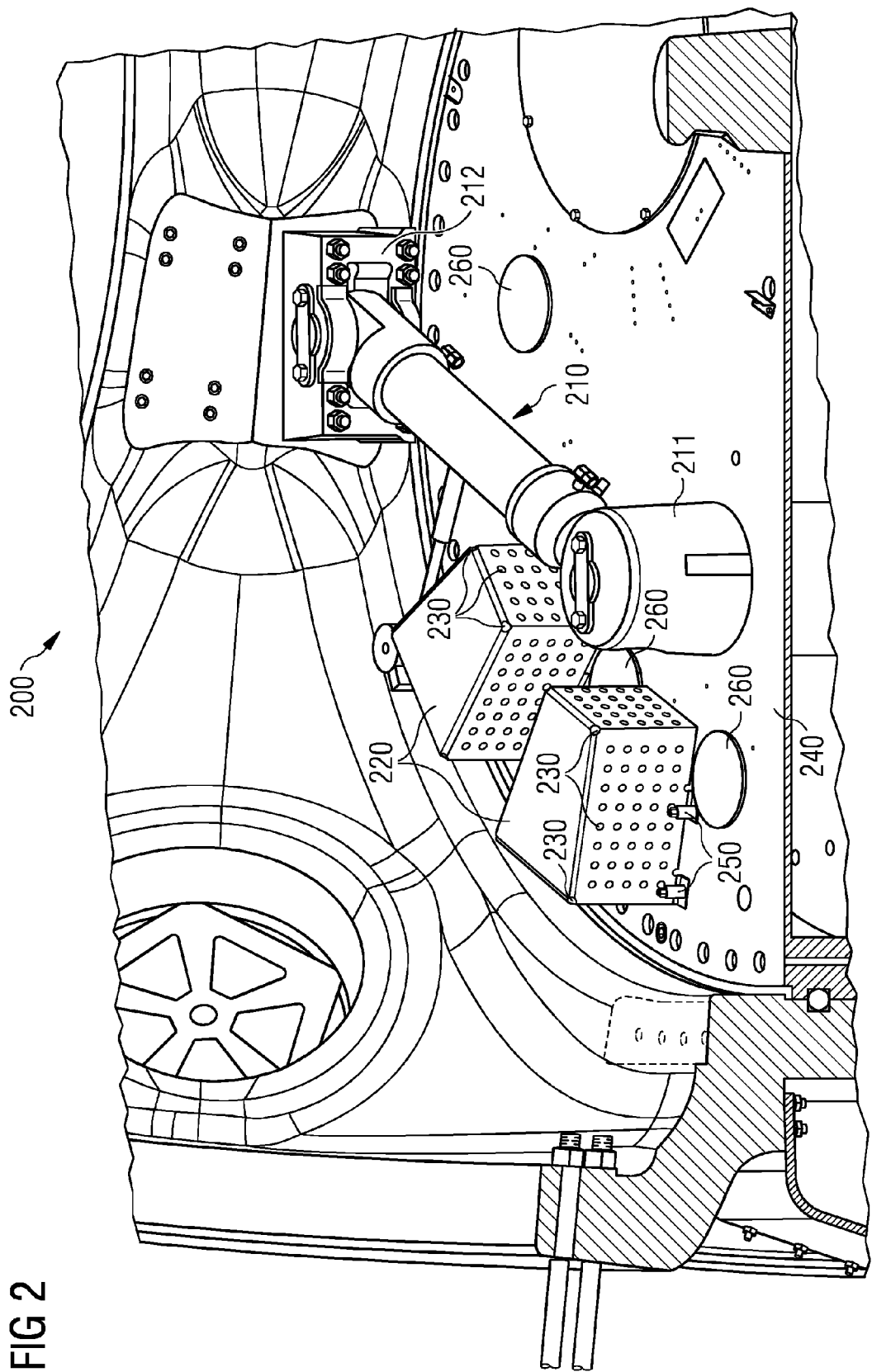
FIG. 2 illustrates a schematical view of an interior of a rotor hub thereby showing an exemplary embodiment of the proposed solution.

FIG. 2 illustrates a schematical view of an interior 200 of a rotor hub thereby showing an exemplary embodiment of the proposed solution. The interior 200 of the rotor hub represents a rotatable part of a wind turbine.

A hydraulic blade pitch system 210 is located in the interior 200 of the rotor hub, being attached via a first support element 211 to a blade bearing reinforcement plate 240 and via a second support element 212 to a, e.g., casted inner surface of the rotor hub.

According to the exemplary scenario as shown in FIG. 2, oil is leaking of the hydraulic blade pitch system 210 causing oil spillage 260 within the interior 200 of the rotor hub like, e.g., on a surface of the blade bearing reinforcement plate 240.

To enable absorption of the oil spillage 260, two absorber elements 220 comprising lubricant absorbing material are secured to the blade bearing reinforcement plate 240 via securing elements 250. Any shape may be possible for the absorber elements 220, preferable adjusted to the characteristics (like, e.g., available space) of the interior 200 of the rotor hub. According to the example as shown in FIG. 2, each absorber element 200 comprises a box or container housing the lubricant absorbing material inside.

It should be noted, that an arbitrary number of absorber elements or boxes 220 can be placed within the interior 200 of the rotor hub, dependent on, e.g., the characteristics of the interior 200 of the rotor hub.

As an example, one or several oil absorbing pillows can be used as lubricant absorbing material placed inside each of the boxes 220. Alternatively, oil absorbing cloth or oil absorbing pulp may be used.

The boxes 220 may be made of any material like, e.g., metal or composite, being qualified to withstand hydraulic oil.

According to a further embodiment of the proposed solution, the absorber element may at least partly or purely consist of the lubricant absorbing material which may have, e.g., the shape of a box or container.

It should be further noted, that the lubricant absorbing material may be directly secured within the interior 200 of the rotor hub like, e.g., secured directly to the blade bearing reinforcement plate 240 or to the inner surface of the rotor hub.

The lubricant absorbing material may be any material enabling absorption of hydraulic oil like, e.g., polypropylene.

As shown in FIG. 2, the boxes 220 are attached to the blade bearing reinforcement plate 240 and therefore being part of a rotatable part of the rotor hub. Hence, during operation of the wind turbine and due to the ongoing rotation of the rotor hub, the oil spillage 260 will run past the boxes 220.

According to a preferred embodiment, each of the boxes 220 comprises several holes or openings 230 to enable proper access of the oil spillage 260 to the lubricant absorbing material placed inside the boxes 220. Preferably, at least a part of the holes or openings (not visible) are located at a side of the box closest to the reinforcement plate 240 allowing easy access of the oil spillage 260 to the lubricant absorbing material.

According to an advanced embodiment of the proposed solution (not shown), additional oil guides in form of plates or shovels are placed within the interior 200 of the rotor hub, e.g., being attached to the blade bearing reinforcement plate 240. By the use of theses plates or shovels and due to the ongoing rotation of the rotor hub, the oil spillage 260 will be guided or shoveled to the boxes 220.

Figure 3:
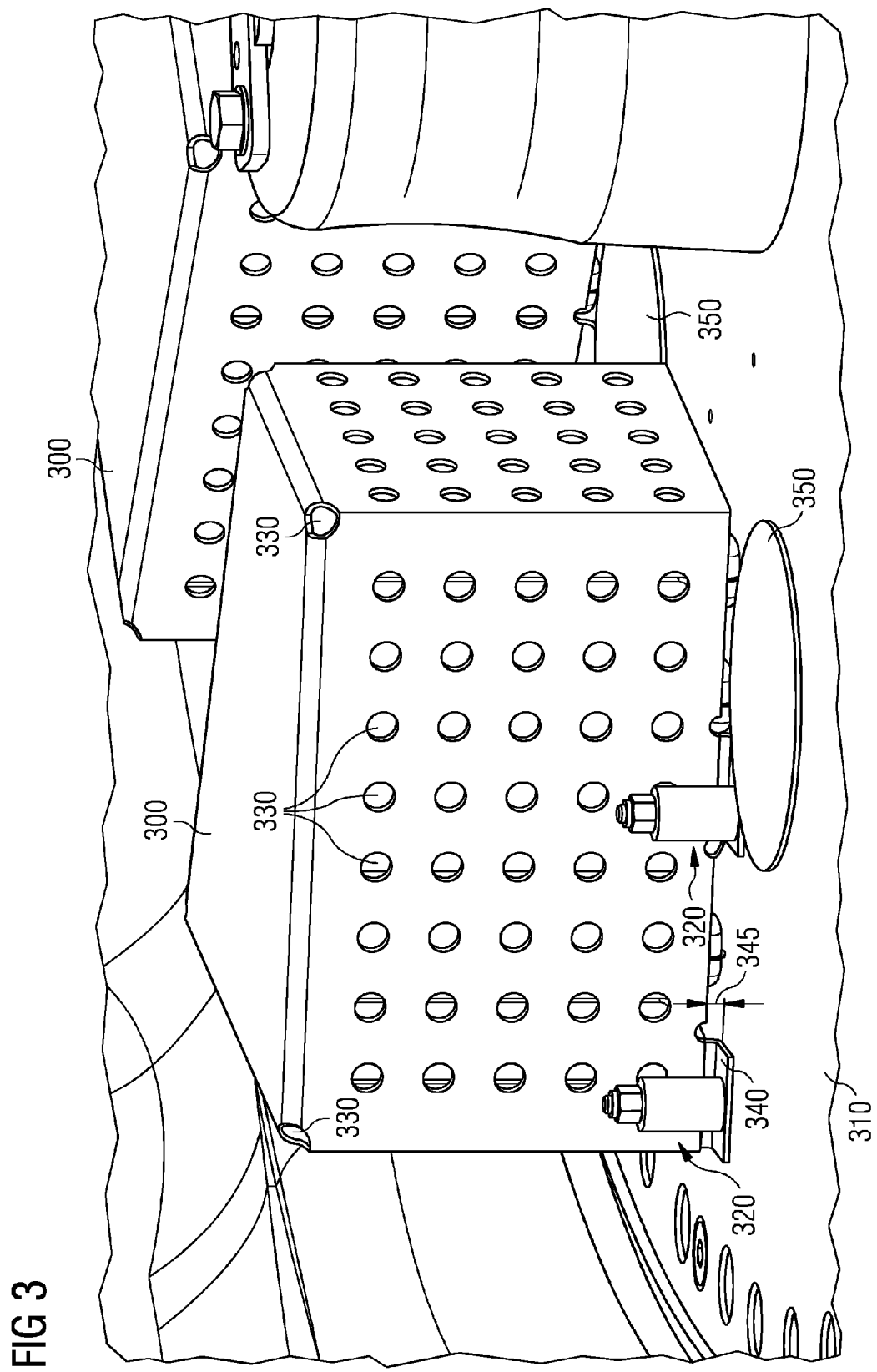
FIG. 3 illustrates a more detailed schematical view of an embodiment of the absorber element as shown in FIG. 2.

FIG. 3 illustrates a more detailed schematical view of the absorber elements shown in FIG. 2. An absorber element 300 comprising a box is secured to a surface of a blade bearing reinforcement plate 310 via securing elements 320 like, e.g., screws. The box 300 comprises several holes or openings 330.

By using one or several distance elements 340, a gap (illustrated by a double arrow 345 in FIG. 3) is provided between the box 300, i.e. a side of the box 300 being closest to the blade bearing reinforcement plate 310 and the surface of the reinforcement plate 310. Further, a side of the box 300 being closest to the reinforcement plate 310 provides several holes or openings (not visible). According to an alternative embodiment, the box 300 is at least partly open towards the surface of the reinforcement plate 310.

Due to the ongoing rotation of the rotor hub, wasted oil spillage 350 can move or pass through the gap 345 and the holes or openings 330 into the interior of the box 300 and thus will be absorbed by lubricant absorbing material (not visible in FIG. 3) located inside the box 300.

Figure 4:
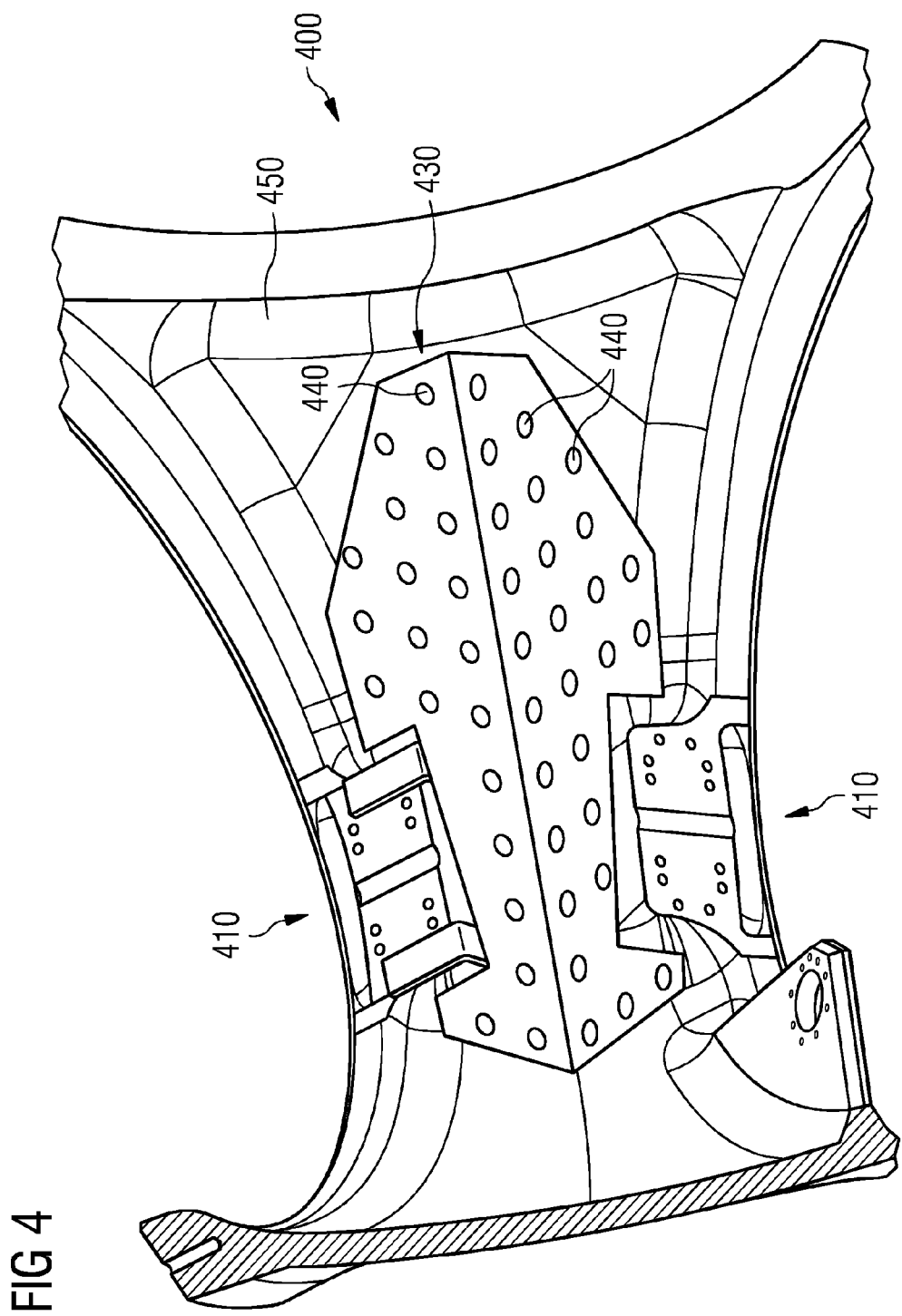
FIG. 4 illustrates in an exemplary schematical view of an alternative embodiment of the proposed solution.

FIG. 4 illustrates in an exemplary schematical view an alternative embodiment of the proposed solution located within an interior 400 of a rotor hub. The interior 400 is part of or representing a rotating part of the rotor hub.

Contrary to the exemplary embodiment as shown in FIG. 3, an absorber element 430 comprising or housing lubricant absorbing material (not visible) is secured to the casted inner surface 450 of the rotor hub. According to the exemplary embodiment as shown in FIG. 4, the shape of the absorber element 430 is adapted to the interior 400, i.e. the inner surface 450 of the rotor hub like, e.g., fitting between two support elements 410 used for, e.g., mounting components of a hydraulic blade pitch system (not shown) within the interior 400 of the rotor hub.

The absorber element 430 comprises several holes or openings 440 enabling access of oil spillage to the lubricant absorbing material located inside the absorber element 430. Due to ongoing rotation of the rotor hub during operation of the wind turbine, occurring oil spillage will be guided through the holes or openings 440 of the absorber element 430 to the lubricant absorbing material placed inside.

In addition to that, due to the particular shape, the absorber element 430 may be advantageously used as a service platform, allowing comfortable service and maintenance activities within the rotor hub or wind turbine.

It should be noted, that an arbitrary number of absorber elements may be placed within the interior 400 of the rotor hub, dependent on the size, available space and characteristics of the interior 400.

As an advantage, the absorber element according to the proposed solution has a low complexity and a simple design. The proposed absorber element can be secured/mounted during production of the rotor hub or the wind turbine without hindering the installation of the rotor blades.

Thus, securing one or several absorber elements to the rotating part within the rotor hub or to any rotating part within the wind turbine is a simple and cheap solution for absorbing any lubricant wasted inside the rotor hub or wind turbine. Placing the absorber element within the interior of the rotor hub (like, e.g., at the blade bearing reinforcement plate) or within the interior of the wind turbine and due to the ongoing rotation of the rotor hub (or any other rotating part of the wind turbine), the lubricant like, e.g., oil spillage will run past the absorber element continuously where it will be collected and absorbed.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A wind turbine comprising:
   a rotatable part; and
   at least one absorber element secured to the rotatable part within an interior of the wind turbine, the at least one absorber element at least partly comprising lubricant absorbing material, wherein the at least one absorber element is a container having at least one side including a plurality of openings, the container having at least one distance element, the at least one distance element having a securing portion secured to at least one reinforcement plate located within an interior of a rotor hub of the wind turbine, and an extension portion projecting upwardly from the securing portion, creating a gap between a surface of the at least one reinforcement plate and the at least one side of the container, so that emerging lubricant can pass through the gap to the lubricant absorbing material;
   wherein the at least one absorber element is configured to absorb emerging lubricant inside the wind turbine.

2. The wind turbine according to claim 1, wherein the lubricant absorbing material comprises oil-absorbent and/or grease-absorbent material.

3. The wind turbine according to claim 1, wherein the lubricant absorbing material comprises polypropylene.

4. The wind turbine according to claim 1, wherein at least a part of the plurality of openings of the container is located at a side of the container closest to the at least one reinforcement plate.

5. The wind turbine according to claim 1, wherein the at least one absorber element comprises at least one guiding means for guiding the lubricant to the at least one absorber element.

6. A rotor hub for a wind turbine comprising:
   a rotatable part; and
   at least one absorber element secured to the rotatable part within an interior of the rotor hub, the at least one absorber element at least partly comprising lubricant absorbing material, wherein the at least one absorber element is a container having at least one side including a plurality of openings, the container having at least one distance element, the at least one distance element having a securing portion secured to at least one reinforcement plate located within an interior of the rotor hub of the wind turbine, and an extension portion projecting upwardly from the securing portion, creating a gap between a surface of the at least one reinforcement plate and the at least one side of the container, so that emerging lubricant can pass through the gap to the lubricant absorbing material;
   wherein the at least one absorber element is configured to absorb emerging lubricant inside the rotor hub.

7. An absorber element for a wind turbine comprising:
   at least one securing element for securing the absorber element to a rotatable part within an interior of the wind turbine, wherein the at least one absorber element is a container having at least one side including a plurality of openings, the container having at least one distance element, the at least one distance element having a securing portion secured, by the at least one securing element, to at least one reinforcement plate located within the interior of a rotor hub of the wind turbine, and an extension portion projecting upwardly from the securing portion, creating a gap between a surface of the at least one reinforcement plate and the at least one side of the container; and a lubricant absorbing material, wherein the absorber element is configured to absorb emerging lubricant inside the wind turbine that passes through the gap.

8. A method for maintaining a clean environment in a wind turbine, comprising the following steps:

securing at least one absorber element to a rotatable part of the wind turbine, the at least one absorber element comprising lubricant absorbing material, wherein the at least one absorber element is a container having at least one side including a plurality of openings, the container having at least one distance element, the at least one distance element having a securing portion secured to at least one reinforcement plate located within an interior of a rotor hub of the wind turbine, and an extension portion projecting upwardly from the securing portion, creating a gap between a surface of the at least one reinforcement plate and the at least one side of the container, so that emerging lubricant can pass through the gap to the lubricant absorbing material;

operating the wind turbine, so that the rotatable part of the wind turbine rotates relative to a static part of the wind turbine; and absorbing emerging lubricant inside the wind turbine with the at least one absorber element.

* * * * *